US012687229B2

(12) United States Patent
Negishi et al.

(10) Patent No.: US 12,687,229 B2
(45) Date of Patent: Jul. 21, 2026

(54) PAIR OF SLIDING COMPONENTS

(71) Applicant: EAGLE INDUSTRY CO., LTD., Tokyo (JP)

(72) Inventors: Yuta Negishi, Tokyo (JP); Yuki Maetani, Tokyo (JP); Hiroki Inoue, Tokyo (JP); Ryosuke Uchiyama, Tokyo (JP); Minori Onuma, Tokyo (JP); Gai Yamaguchi, Tokyo (JP); So Makishima, Tokyo (JP); Osamu Matsumoto, Tokyo (JP); Yoshiaki Takigahira, Tokyo (JP); Koji Watanabe, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 27 days.

(21) Appl. No.: 17/920,009

(22) PCT Filed: Apr. 2, 2021

(86) PCT No.: PCT/JP2021/014347
§ 371 (c)(1),
(2) Date: Oct. 19, 2022

(87) PCT Pub. No.: WO2021/215224
PCT Pub. Date: Oct. 28, 2021

(65) Prior Publication Data
US 2023/0167905 A1     Jun. 1, 2023

(30) Foreign Application Priority Data
Apr. 22, 2020     (JP) ................................. 2020-075820

(51) Int. Cl.
*F16J 15/34*          (2006.01)
(52) U.S. Cl.
CPC ................................. *F16J 15/3424* (2013.01)

(58) Field of Classification Search
CPC ..................................................... F16J 15/3424
See application file for complete search history.

(56) References Cited

U.S. PATENT DOCUMENTS 2,247,505 A * 7/1941 Kohler ................... F16J 15/342
277/408
3,147,013 A * 9/1964 Tracy .................... F04D 29/126
277/400
(Continued)

FOREIGN PATENT DOCUMENTS

CN          1215135          4/1999      ............... F16J 15/54
CN          101975274        2/2011      ............... F16J 15/54
(Continued)

OTHER PUBLICATIONS

U.S. Appl. No. 17/908,515, filed Aug. 31, 2022, Imura.
U.S. Appl. No. 17/913,154, filed Sep. 20, 2022, Imura.

*Primary Examiner* — Vishal A Patel
(74) *Attorney, Agent, or Firm* — HAYES SOLOWAY P.C.

(57)          ABSTRACT
A sliding surface of a second sliding component is provided with a plurality of second positive pressure generation grooves communicating with a leakage side space, extending in a relative rotation direction of the second sliding component, and having closed terminating end portions, a sliding surface of a first sliding component is provided with a plurality of first positive pressure generation grooves communicating with the leakage side space, extending in a relative rotation direction of the second sliding component, and having closed terminating end portions, and the sliding surface and the sliding surface slide on each other at least in such a manner that the first positive pressure generation grooves and the second positive pressure generation grooves overlap and intersect with each other.

1 Claim, 13 Drawing Sheets

(56)           References Cited

U.S. PATENT DOCUMENTS

| | | | | |
|---|---|---|---|---|
| 3,957,276 | A * | 5/1976 | Wiese | F16J 15/3412 |
| | | | | 277/408 |
| 6,152,452 | A * | 11/2000 | Wang | F16J 15/3412 |
| | | | | 277/400 |
| 6,485,021 | B1 * | 11/2002 | Osaki | F16J 15/3412 |
| | | | | 277/400 |
| 7,258,346 | B2 * | 8/2007 | Tejima | F16J 15/3412 |
| | | | | 277/400 |
| 9,353,867 | B2 | 5/2016 | Itadani et al. | F16J 15/3448 |
| 9,714,712 | B2 | 7/2017 | Kiernan | F16J 15/3412 |
| 11,009,072 | B2 | 5/2021 | Kimura et al. | F16J 15/34 |
| 2005/0094906 | A1 | 5/2005 | Satoh | F16C 17/045 |
| 2013/0209011 | A1 | 8/2013 | Tokunaga | F16J 32/0633 |
| 2014/0197600 | A1 | 7/2014 | Hosoe et al. | F16J 15/40 |
| 2015/0377360 | A1 | 12/2015 | Itadani et al. | F16J 15/3488 |
| 2017/0002930 | A1 | 1/2017 | Itadani et al. | F16J 15/3412 |
| 2017/0102074 | A1 | 4/2017 | Itadani et al. | F16J 15/34 |
| 2017/0234431 | A1 | 8/2017 | Katori et al. | F16J 15/34 |
| 2018/0073394 | A1 | 3/2018 | Tokunaga | F16J 15/3412 |
| 2018/0195618 | A1 | 7/2018 | Itadani | F16J 15/342 |
| 2021/0080009 | A1 | 3/2021 | Kimura | F16J 15/3412 |
| 2022/0099188 | A1 | 3/2022 | Imura et al. | F16J 15/3412 |
| 2022/0099191 | A1 | 3/2022 | Suzuki | F16C 33/103 |
| 2022/0106980 | A1 | 4/2022 | Imura et al. | F16C 17/026 |
| 2022/0120315 | A1 | 4/2022 | Ou | F16C 17/045 |
| 2022/0128088 | A1 | 4/2022 | Suzuki | F16C 33/107 |
| 2022/0145992 | A1 | 5/2022 | Miyazaki | F16C 33/107 |

FOREIGN PATENT DOCUMENTS

| | | | |
|---|---|---|---|
| CN | 107166036 | 9/2017 | F16J 15/16 |
| DE | 3819566 | 12/1989 | F16J 15/34 |
| EP | 0672852 | 9/1995 | F16J 15/34 |
| EP | 3284981 | 2/2018 | F16J 15/34 |
| EP | 3680519 | 7/2020 | F16J 15/34 |
| EP | 3889474 | 10/2021 | F16J 15/34 |
| EP | 3922876 | 12/2021 | F16J 17/04 |
| EP | 4177488 | 5/2023 | F16C 17/04 |
| EP | 4177500 | 5/2023 | F16J 15/16 |
| JP | 59231269 A * | 12/1984 | |
| JP | S59231268 | 12/1984 | F16J 15/34 |
| JP | S59231269 | 12/1984 | F16J 15/34 |
| JP | S6231775 | 2/1987 | F16J 15/34 |
| JP | 2020173020 | 10/2020 | F16J 15/34 |
| KR | 10-2019-0108569 | 9/2019 | F16C 13/10 |
| WO | 2012046749 | 4/2012 | F16J 15/34 |
| WO | 2013035502 | 3/2013 | F16J 15/34 |
| WO | 2014148317 | 9/2014 | F16J 15/34 |
| WO | 2015087800 | 6/2015 | F16J 15/34 |
| WO | 2015199172 | 12/2015 | F16J 15/34 |
| WO | 2016167262 | 10/2016 | F16J 15/34 |
| WO | 2019049847 | 3/2019 | F16J 15/34 |
| WO | WO2019221226 | 11/2019 | F16J 15/18 |
| WO | 2020162348 | 8/2020 | F16C 17/04 |
| WO | 2020162349 | 8/2020 | F16C 17/04 |
| WO | 2020166589 | 8/2020 | F16C 17/04 |

* cited by examiner

ROTATION DIRECTION
OF ROTATING SEAL RING

PAIR OF SLIDING COMPONENTS

TECHNICAL FIELD

The present invention relates to a pair of sliding components that rotates relative to each other and is used for, for example, a shaft sealing device shaft-sealing a rotary shaft of a rotating machine in an automotive seal field, a general industrial machinery seal field, or another seal field or a bearing of a machine in an automotive bearing field, a general industrial machinery bearing field, or another bearing field.

BACKGROUND ART

As a shaft sealing device that prevents a leakage of a sealing target fluid, for example, a mechanical seal includes a pair of annular sliding components rotating relative to each other so that sliding surfaces slide on each other. In such a mechanical seal, there has been a recent demand to reduce the energy lost caused by sliding for environmental measures and the like.

For example, in a mechanical seal shown in Patent Citation 1, a pair of annular sliding components is configured to be relatively rotatable, a sealing target fluid exists in an outer space, and a low-pressure fluid exists in an inner space. One sliding component is provided with a plurality of spiral grooves communicating with the inner space, extending in an arc shape from an inner radial end to an outer radial side while being inclined in a circumferential direction, and having terminating ends closed on the downstream side of the relative rotation direction. Accordingly, since the low-pressure fluid is introduced from the inner space into the spiral groove of one sliding component during the relative rotation of the pair of sliding components, a positive pressure is generated at the terminating end and the vicinity thereof to slightly separate sliding surfaces of the pair of sliding components from each other. As a result, it is possible to reduce friction.

CITATION LIST

Patent Literature

Patent Citation 1: Microfilm of Japanese Patent Application No. S60-170286 (JP S62-31775) (Pages 2 and 3, FIG. 2)

SUMMARY OF INVENTION

Technical Problem

However, in the sliding component shown in Patent Citation 1, since the spiral groove is provided in one sliding component, extends from the inner radial end toward the outer radial side, and introduces the low-pressure fluid of the inner space, it is possible to reduce wear. However, since a sufficient dynamic pressure is not generated in the spiral groove until the sliding component reaches a high-speed rotation state of a certain level or more, it takes time to separate the sliding surfaces. As a result, there is a risk that the sliding surfaces will wear each other.

The present invention has been made in view of such problems and an object thereof is to provide a pair of sliding components capable of suppressing wear between sliding surfaces from the start of a relative rotation to a high-speed rotation and suppressing a leakage of a sealing target fluid.

Solution to Problem

In order to solve the foregoing problems, a pair of sliding components according to the present invention is a pair of sliding components disposed at a relatively rotating position of a rotating machine, one of the sliding components being a first sliding component having a sliding surface, remaining one of the sliding components being a second sliding component having a sliding surface, the sliding surfaces of the first sliding component and the second sliding component sliding relative to each other, wherein the sliding surface of the first sliding component is provided with a plurality of first positive pressure generation grooves communicating with a leakage side space, extending in a relative rotation direction of the second sliding component with respect to the first sliding component, and having closed terminating end portions, wherein the sliding surface of the second sliding component is provided with a plurality of second positive pressure generation grooves communicating with the leakage side space, extending in a relative rotation direction of the first sliding component with respect to the second sliding component, and having closed terminating end portions, and wherein the sliding surfaces of the first sliding component and the second sliding component slide on each other at least in such a manner that the first positive pressure generation grooves and the second positive pressure generation grooves overlap and intersect with each other. According to the aforesaid feature of the present invention, since the intersection portions of the first positive pressure generation groove and the second positive pressure generation groove communicate with each other, it is also possible to take a fluid from the facing first positive pressure generation groove or the facing second positive pressure generation groove in addition to the communication portion to the leakage side space in the first positive pressure generation groove and the second positive pressure generation groove during the low-speed relative rotation and thus to immediately generate a force for separating the sliding surfaces from each other.

It may be preferable that at least two of the second positive pressure generation grooves are be arranged to intersect with each of the first positive pressure generation grooves. According to this preferable configuration, since it is possible to take a fluid from the plurality of second positive pressure generation grooves into the first positive pressure generation grooves during the relative rotation of the pair of sliding components, it is possible to generate a positive pressure at an early time in the first positive pressure generation groove.

It may be preferable that each of the first positive pressure generation grooves and each of the second positive pressure generation grooves obliquely extend in a circumferential direction from a leakage side toward a sealing target fluid side. According to this preferable configuration, since it is possible to arrange a large number of the first positive pressure generation grooves or the second positive pressure generation grooves on the sliding surfaces of the first sliding component and the second sliding component, the degree of freedom in design is high.

It may be preferable that the terminating end portion of each of the first positive pressure generation grooves and the terminating end portion of each of the second positive pressure generation grooves are offset from each other in a radial direction. According to this preferable configuration, since the positive pressure generated at the terminating end portion of the first positive pressure generation groove and the positive pressure generated at the terminating end portion of the second positive pressure generation groove do not interfere with each other, it is possible to stably separate the sliding surfaces from each other.

It may be preferable that the volume of each of the first positive pressure generation grooves is smaller than the volume of each of the second positive pressure generation grooves. According to this preferable configuration, since the volume of the first positive pressure generation groove is smaller than the volume of the second positive pressure generation groove, a first force caused by the positive pressure generated by the fluid in the first positive pressure generation groove mainly acts to separate the sliding surfaces from each other during the low-speed relative rotation of the sliding component. As the relative rotation speed of the sliding component further increases, a second force caused by the positive pressure generated by the fluid in the second positive pressure generation groove increases. When the relative rotation speed of the sliding component is sufficiently high, the second force becomes larger than the first force. Accordingly, the second force mainly acts to separate the sliding surfaces from each other. As a result, it is possible to suppress the wear between the sliding surfaces from the low speed to the high speed of the relative rotation of the pair of sliding components. Further, since a gap formed between the sliding surfaces increases during the high-speed relative rotation of the sliding component, a positive pressure is not easily generated in the first positive pressure generation groove and the second force caused by the positive pressure generated in the second positive pressure generation groove can mainly act to stably separate the sliding surfaces from each other. Thus, it is possible to suppress the wear by separating the sliding surfaces from each other from the start of the relative rotation of the pair of sliding components to the high-speed rotation.

It may be preferable that each of the first positive pressure generation grooves has a short extension length compared to each of the second positive pressure generation grooves. According to this preferable configuration, since the terminating end portion of the first positive pressure generation groove is close to the starting end portion communicating with the leakage side space in relation to the terminating end portion of the second positive pressure generation groove, it is possible to generate a positive pressure at an early time in the first positive pressure generation groove.

It may be preferable that a depth of each of the first positive pressure generation grooves is shallower than a depth of each of the second positive pressure generation grooves. According to this preferable configuration, it is possible to generate a positive pressure at an early time in the first positive pressure generation groove.

It may be preferable that each of the first positive pressure generation grooves is inclined along the circumferential direction compared to each of the second positive pressure generation grooves. According to this preferable configuration, since it is possible to easily introduce a fluid into the first positive pressure generation groove compared to the second positive pressure generation groove when the relative rotation of the sliding component starts, it is possible to generate a positive pressure at an early time in the first positive pressure generation groove.

It may be preferable that a width dimension of each of the first positive pressure generation grooves is smaller than a width dimension of each of the second positive pressure generation grooves. According to this preferable configuration, since the width dimension of the first positive pressure generation groove is smaller than the width dimension of the second positive pressure generation groove, it is possible to generate a positive pressure at an early time in the first positive pressure generation groove.

It may be preferable that the first sliding component is a stationary seal ring and the second sliding component is a rotating seal ring. According to this preferable configuration, since the first sliding component is the stationary seal ring, the positive pressure generated in the first positive pressure generation groove during the low-speed rotation is stabilized. Further, since the second sliding component is the rotating seal ring, it is possible to easily introduce the fluid into the second positive pressure generation groove and to separate the sliding surfaces from each other at an early time by mainly using the second force.

DESCRIPTION OF EMBODIMENTS

Figure 1:
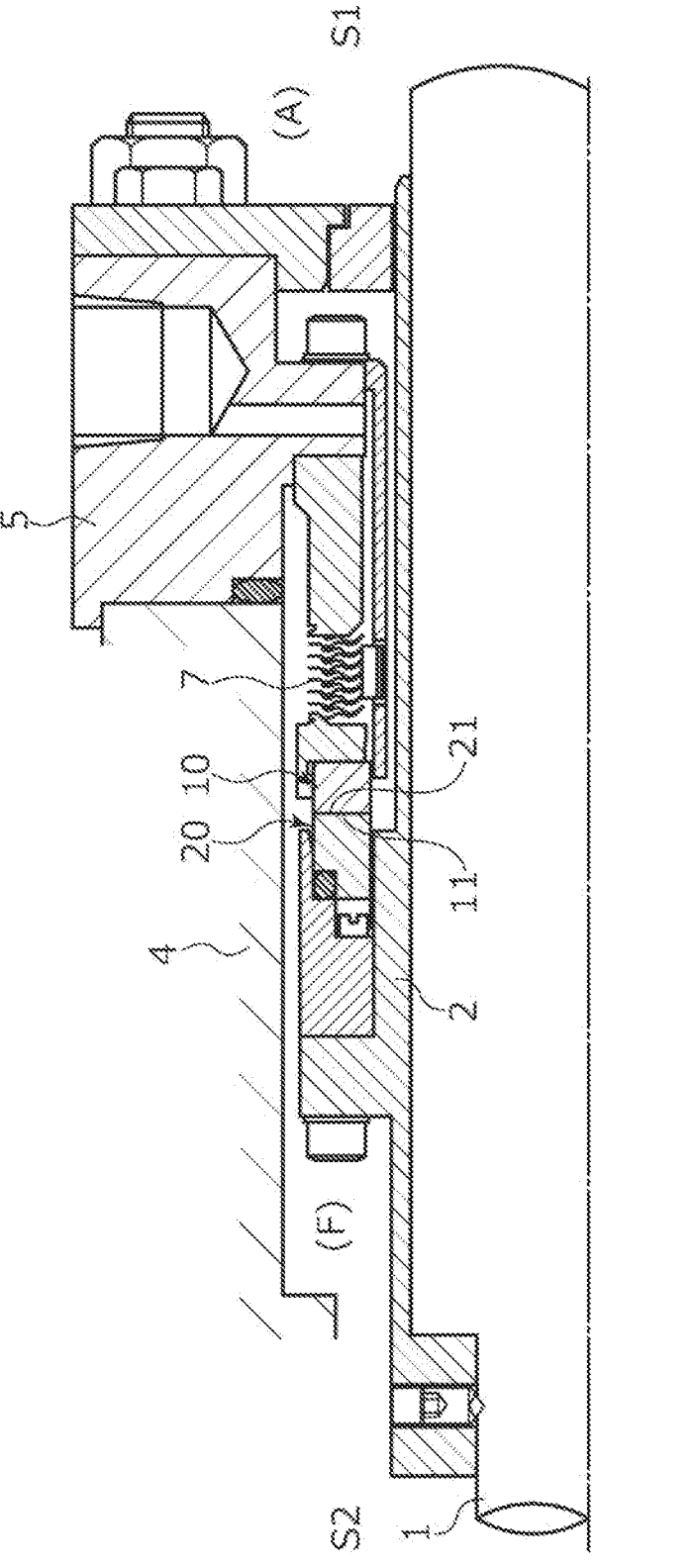
FIG. 1 is a longitudinal sectional view showing an example of a mechanical seal including a pair of sliding components according to a first embodiment of the present invention.

Modes for carrying out a pair of sliding components according to the present invention will be described below on the basis of the embodiments.

First Embodiment

A pair of sliding components according to a first embodiment will be described with reference to FIGS. 1 to 7. Additionally, in this embodiment, an embodiment in which a pair of sliding components is a mechanical seal will be described as an example. Further, a description will be made such that a sealing target fluid exists in an outer space of the mechanical seal, an atmosphere exists in an inner space, an outer radial side of a sliding component constituting the mechanical seal is a sealing target fluid side (i.e., high pressure side), and an inner radial side thereof is a leakage side (i.e., low pressure side). Further, for convenience of description, in the drawings, dots may be added to a groove and the like formed on a sliding surface.

A mechanical seal for general industrial machines shown in FIG. 1 is of an inside type that seals a sealing target fluid F tending to leak from the outer radial side toward the inner radial side of the sliding surface and allows an inner space S1 to communicate with an atmosphere A. Additionally, in this embodiment, an embodiment in which the sealing target fluid F is a high-pressure liquid and the atmosphere A is a gas having a pressure lower than that of the sealing target fluid F is illustrated.

The mechanical seal mainly includes a rotating seal ring 20 which is a second sliding component attached to a sleeve 2 fixed to a rotary shaft 1, provided to be rotatable together with the rotary shaft 1, and having an annular shape and an annular stationary seal ring 10 which is a first sliding component provided in a seal cover 5 fixed to a housing 4 of an attachment target device not to be rotatable and to be movable in the axial direction and when a bellows 7 urges the stationary seal ring 10 in the axial direction, a sliding surface 11 of the stationary seal ring 10 and a sliding surface 21 of the rotating seal ring 20 slide closely with each other.

The stationary seal ring 10 and the rotating seal ring 20 are typically formed of SiC (as an example of hard material) or a combination of SiC and carbon (as an example of soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., coating material), a composite material, and the like can also be applied.

Figure 2:
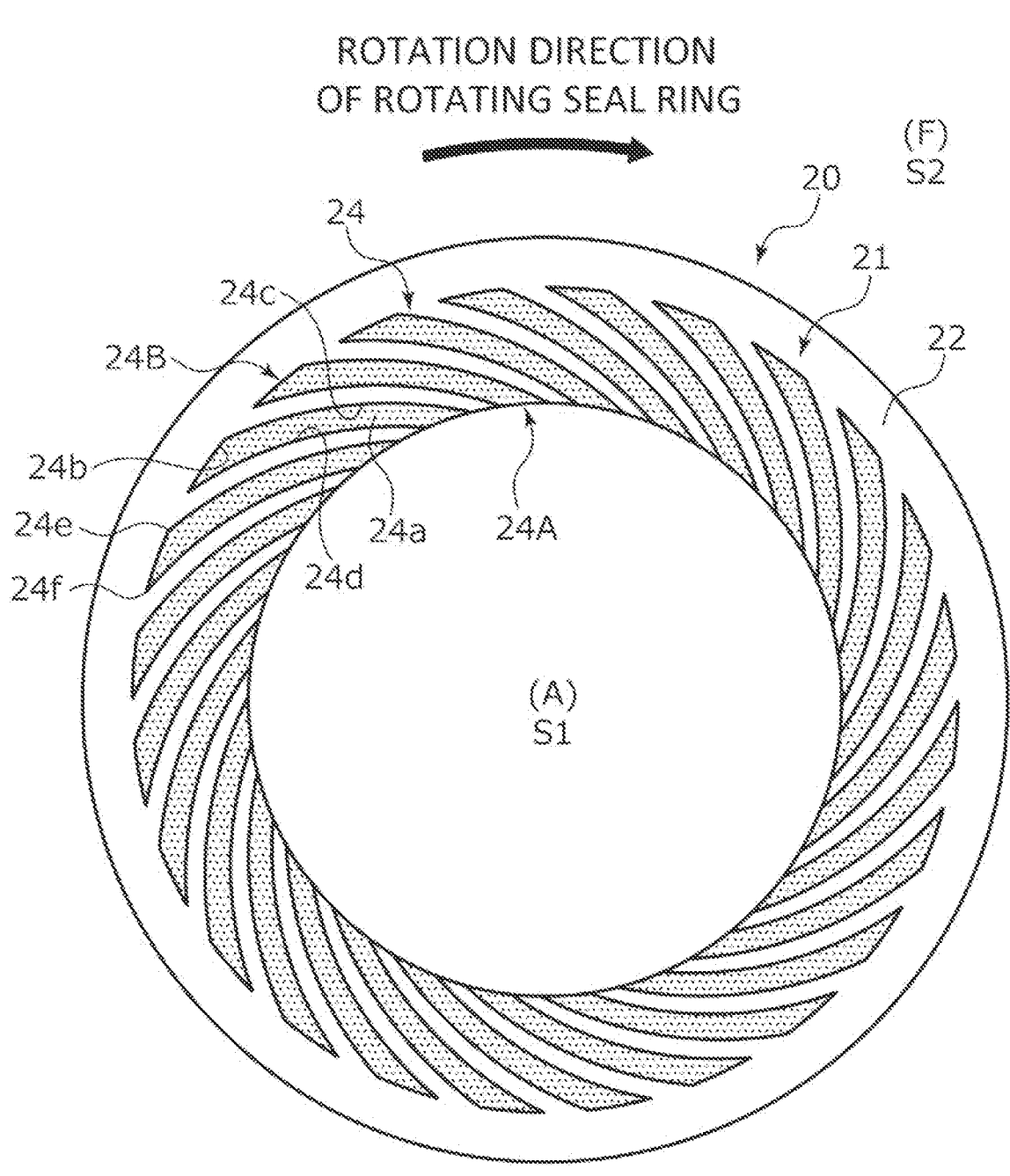
FIG. 2 is a view showing a sliding surface of a rotating seal ring from the axial direction in the first embodiment.

As shown in FIG. 2, a plurality of (for example, in the first embodiment, twenty four) second positive pressure generation grooves 24 are evenly arranged in the circumferential direction on the inner radial side of the sliding surface 21 of the rotating seal ring 20. Additionally, a portion other than the second positive pressure generation groove 24 of the sliding surface 21 is a land 22 forming a flat surface.

In the second positive pressure generation groove 24, an inner radial end portion, that is, a relative rotation starting end 24A communicates with an inner space S1 and extends in an arc shape from the starting end 24A toward the outer radial side while being inclined to the upstream side of the rotation direction of the rotating seal ring 20 and an outer radial end portion, that is, a relative rotation terminating end 24B is closed to be in a non-communication state with an outer space S2. The second positive pressure generation groove 24 has an arc shape protruding toward the outer radial side.

Specifically, the second positive pressure generation groove 24 includes a bottom surface 24a which is flat from the starting end 24A to the terminating end 24B and is parallel to the flat surface of the land 22, a wall portion 24b which extends vertically from the end edge of the terminating end 24B of the bottom surface 24a toward the flat surface of the land 22, and side wall portions 24c and 24d which extend vertically from the side edge of the bottom surface 24a toward the flat surface of the land 22. Additionally, an angle formed by the wall portion 24b and the side wall portion 24c is an obtuse angle, an angle formed by the wall portion 24b and the side wall portion 24d is an acute angle, and an acute angle portion 24f on the side of the side wall portion 24d of the wall portion 24b is located on the upstream side of the rotation direction of the rotating seal ring 20 in relation to an obtuse angle portion 24e on the side of the side wall portion 24c of the wall portion 24b.

The plurality of (for example, in the first embodiment, three) second positive pressure generation grooves 24 are arranged to overlap each other in the radial direction when viewed from the axial direction. In other words, the plurality of (for example, in the first embodiment, three) second positive pressure generation grooves 24 are arranged on the radius line.

Figure 3:
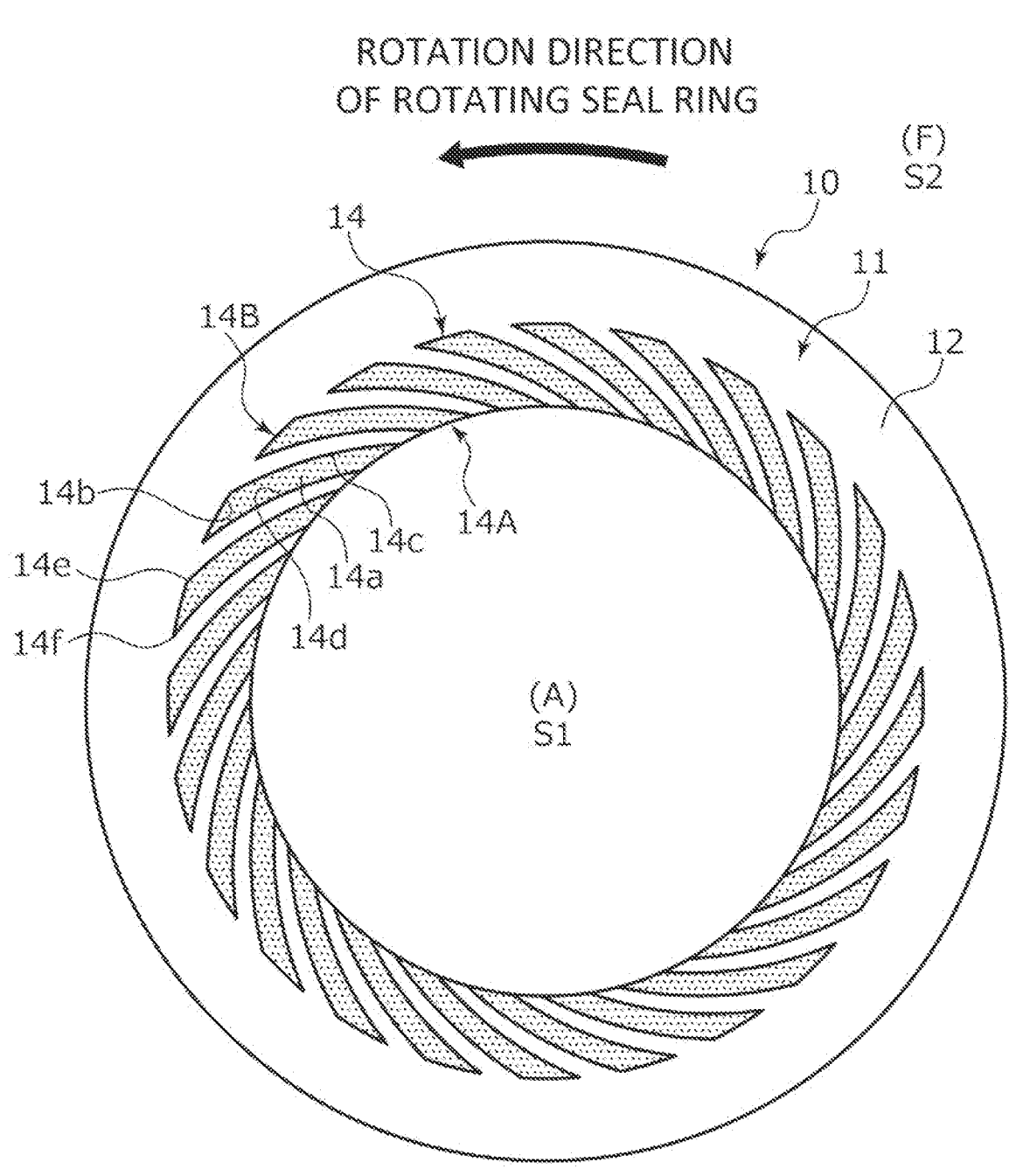
FIG. 3 is a view showing a sliding surface of a stationary seal ring from the axial direction in the first embodiment.

As shown in FIG. 3, the rotating seal ring 20 slides counterclockwise relative to the stationary seal ring 10 as indicated by the arrow and a plurality of (for example, in the first embodiment, twenty four) first positive pressure generation grooves 14 are evenly arranged in the circumferential direction on the inner radial side of the sliding surface 11 of the stationary seal ring 10. Additionally, a portion other than the first positive pressure generation groove 14 of the sliding surface 11 is a land 12 forming a flat surface.

In the first positive pressure generation groove 14, an inner radial end portion, that is, a relative rotation starting end 14A communicates with the inner space S1 and extends in an arc shape from the starting end 14A toward the outer radial side while being inclined to the downstream side of the rotation direction of the rotating seal ring 20 and an outer radial end portion, that is, a relative rotation terminating end 14B is closed to be in a non-communication state with the outer space S2. The first positive pressure generation groove 14 has an arc shape protruding toward the outer radial side.

Specifically, the first positive pressure generation groove 14 includes a bottom surface 14a which is flat from the starting end 14A to the terminating end 14B and is parallel to the flat surface of the land 12, a wall portion 14b which extends vertically from the end edge of the terminating end 14B of the bottom surface 14a toward the flat surface of the land 12, and side wall portions 14c and 14d which extend vertically from the side edge of the bottom surface 14a toward the flat surface of the land 12. Additionally, an angle formed by the wall portion 14b and the side wall portion 14c is an obtuse angle, an angle formed by the wall portion 14b and the side wall portion 14d is an acute angle, and an acute angle portion 14f on the side of the side wall portion 14d of the wall portion 14b is located on the downstream side of the rotation direction of the rotating seal ring 20 in relation to the obtuse angle portion 14e on the side of the side wall portion 14c of the wall portion 14b.

The plurality of (for example, in the first embodiment, two) first positive pressure generation grooves 14 are arranged to overlap each other in the radial direction when viewed from the axial direction. In other words, the plurality of (for example, in the first embodiment, two) first positive pressure generation grooves 14 are arranged on the radius line.

Figure 4:
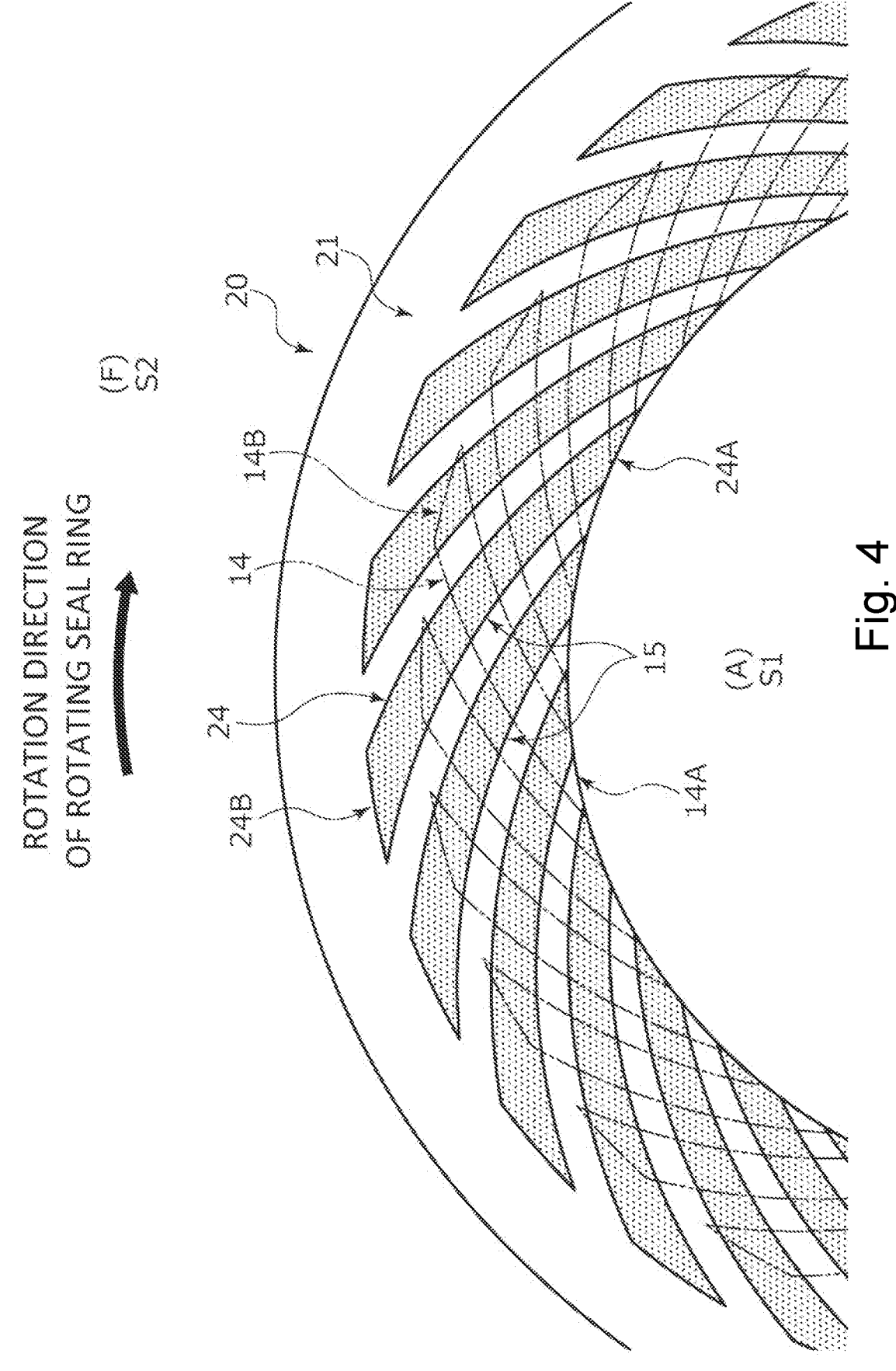
FIG. 4 is a schematic view illustrating a state in which the sliding surface of the stationary seal ring and the sliding surface of the rotating seal ring are arranged to face each other in the first embodiment, where a first positive pressure generation groove of the stationary seal ring is indicated by a two-dotted chain line.

As shown in FIG. 4, the first positive pressure generation groove 14 and the second positive pressure generation groove 24 are arranged to intersect each other when viewed from the axial direction while the sliding surface 11 of the stationary seal ring 10 faces the sliding surface 21 of the rotating seal ring 20. Additionally, FIG. 4 shows the sliding surface 21 of this rotating seal ring 20 from the axial direction, the second positive pressure generation groove 24 is indicated by a solid line, and the facing first positive pressure generation groove 14 is indicated by a two-dotted chain line.

Specifically, a plurality of (in this embodiment, five) second positive pressure generation grooves 24 are arranged to intersect and face one first positive pressure generation groove 14 and a plurality of (in this embodiment, five) first positive pressure generation grooves 14 are arranged to intersect and face one second positive pressure generation groove 24. That is, a plurality of intersection portions 15 of the first positive pressure generation groove 14 and the second positive pressure generation groove 24 are formed.

Figure 5:
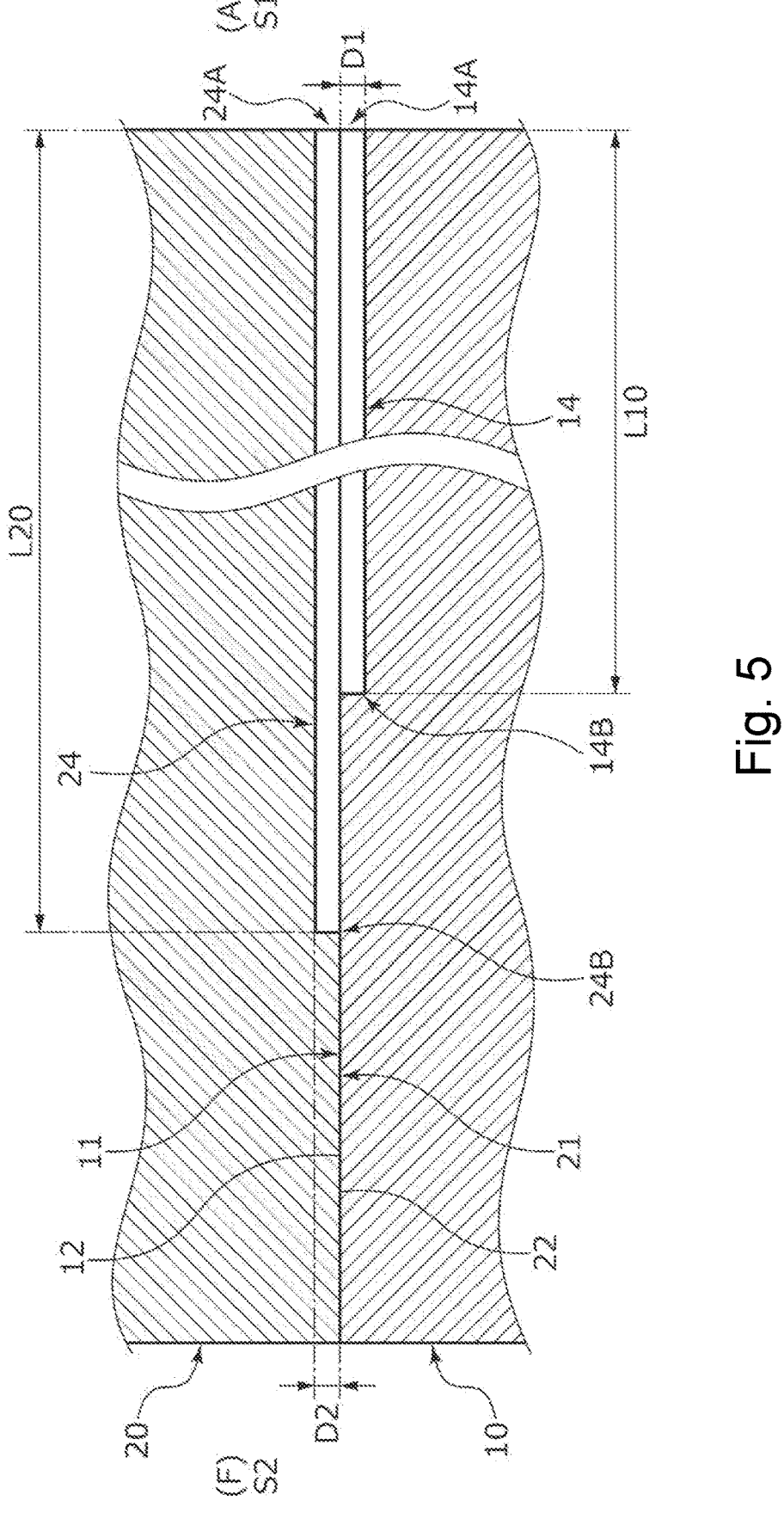
FIG. 5 is a cross-sectional view schematically showing a first positive pressure generation groove and a second positive pressure generation groove in the first embodiment.

Further, as shown in FIGS. 4 and 5, the length of the first positive pressure generation groove 14 from the starting end 14A to the terminating end 14B, that is, the extension length L10 of the first positive pressure generation groove 14 is shorter than the length of the second positive pressure generation groove 24 from the starting end 24A to the terminating end 24B, that is, the extension length L20 of the second positive pressure generation groove 24 (L10<L20).

In addition, FIG. 5 is a schematic cross-sectional view in which each of one set of the first positive pressure generation grooves 14 and one set of the second positive pressure generation grooves 24 is cut in the longitudinal direction and disposed at the same position in the axial direction for convenience of description.

Specifically, the extension length L10 of the first positive pressure generation groove 14 is about ⅔ of the extension length L20 of the second positive pressure generation groove 24.

That is, the terminating end 24B of the second positive pressure generation groove 24 is disposed on the outer radial side in relation to the terminating end 14B of the first positive pressure generation groove 14.

Further, the first positive pressure generation groove 14 and the second positive pressure generation groove 24 have substantially the same width dimensions. That is, since the extension length L10 of the first positive pressure generation groove 14 is shorter than the extension length L20 of the second positive pressure generation groove 24, the area of this first positive pressure generation groove 14 from the axial direction is smaller than the area of the second positive pressure generation groove 24.

Further, as shown in FIG. 5, the first positive pressure generation groove 14 has a constant depth D1 from the starting end 14A to the terminating end 14B.

Further, the second positive pressure generation groove 24 has a constant depth D2 from the starting end 24A to the terminating end 24B. Additionally, the depth D1 of the first positive pressure generation groove 14 and the depth D2 of the second positive pressure generation groove 24 have the same dimensions (D1=D2).

The volume of the first positive pressure generation groove 14 and the second positive pressure generation groove 24 is obtained by multiplying the depths D1 and D2 by the area of the first positive pressure generation groove 14 and the second positive pressure generation groove 24 when viewed from the axial direction. As described above, since the area of this first positive pressure generation groove 14 from the axial direction is smaller than the area of the second positive pressure generation groove 24 and the depth D1 of the first positive pressure generation groove 14 and the depth D2 of the second positive pressure generation groove 24 are the same dimensions, the capacity of the first positive pressure generation groove 14 is smaller than the volume of the second positive pressure generation groove 24.

Further, in this first embodiment, the inclination in the circumferential direction of the first positive pressure generation groove 14 with respect to the inner peripheral surface of the stationary seal ring 10 when the sliding surface 11 is viewed in the axial direction is the same as the inclination in the circumferential direction of the second positive pressure generation groove 24 with respect to the inner peripheral surface of the rotating seal ring 20 when the sliding surface 21 is viewed in the axial direction.

Next, the flow of the atmosphere A during the relative rotation of the stationary seal ring 10 and the rotating seal ring 20 will be schematically described with reference to FIG. 6. Additionally, the flow of the atmosphere A of FIG. 6 is schematically shown without specifying the relative rotation speed of the rotating seal ring 20.

Figure 6A:
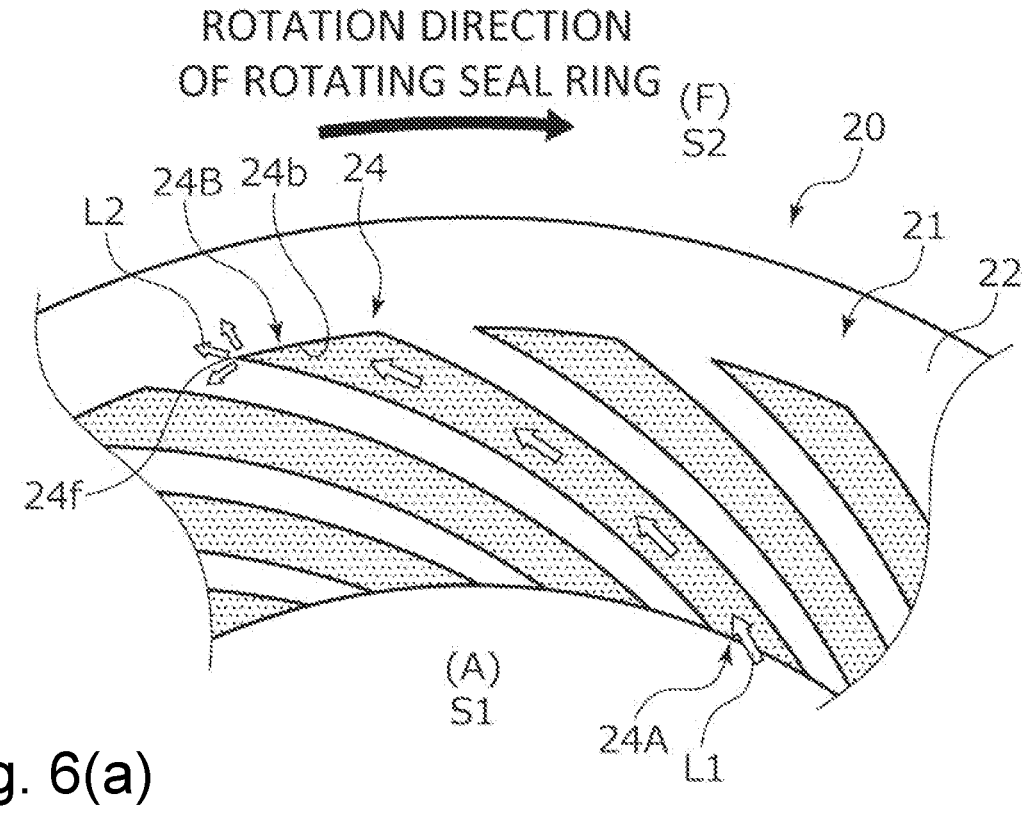
FIG. 6A is an explanatory diagram showing the movement of a fluid of the second positive pressure generation groove from the axial direction in the first embodiment and FIG. 6B is an explanatory diagram showing the movement of a fluid of the first positive pressure generation groove from the axial direction in the first embodiment.

First, the flow of the atmosphere A in the second positive pressure generation groove 24 will be described. As shown in FIG. 6A, when the rotating seal ring 20 rotates relative to the stationary seal ring 10, the atmosphere A in the second positive pressure generation groove 24 moves from the starting end 24A toward the terminating end 24B as indicated by the arrow L1.

The atmosphere A moving toward the terminating end 24B increases the pressure of the acute angle portion 24f of the wall portion 24b of the second positive pressure generation groove 24 and the vicinity thereof and flows out between the sliding surfaces 11 and 21 as indicated by the arrow L2. That is, a positive pressure is generated in the acute angle portion 24f and the vicinity thereof.

Since the atmosphere A in the second positive pressure generation groove 24 indicated by the arrow L2 acts to push back the sealing target fluid F in the vicinity of the terminating end 24B of the second positive pressure generation groove 24 toward the outer space S2, the sealing target fluid F does not leak to the inner space S1.

Figure 6B:
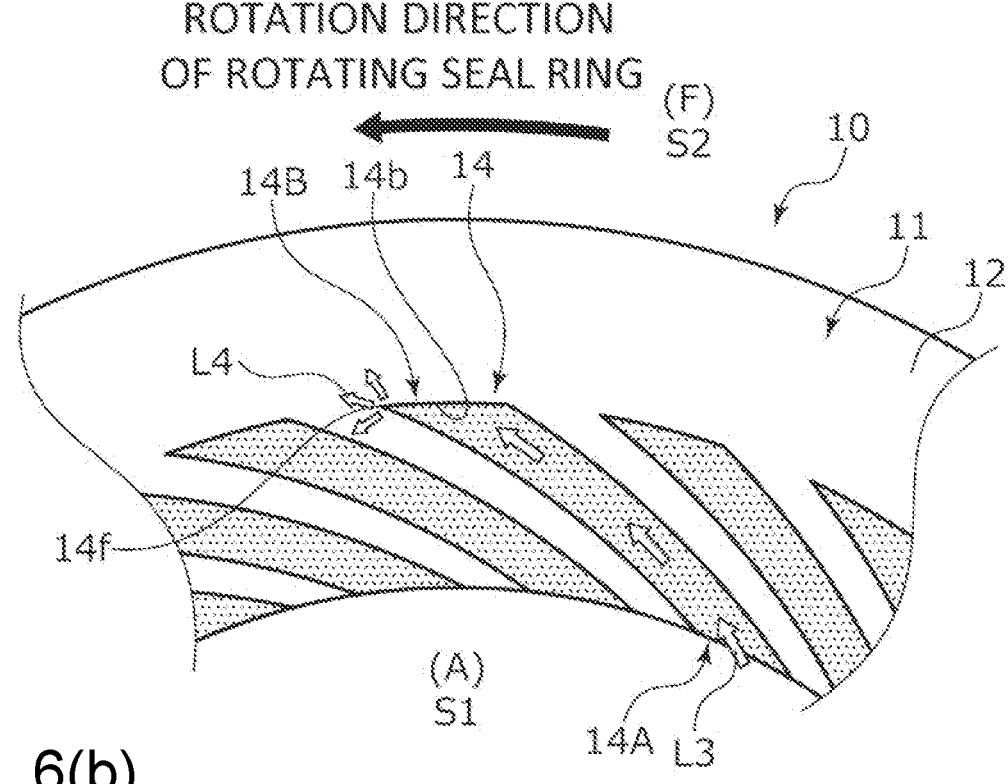

Next, the flow of the atmosphere A in the first positive pressure generation groove 14 will be described. As shown in FIG. 6B, when the rotating seal ring 20 rotates relative to the stationary seal ring 10, the atmosphere A in the first positive pressure generation groove 14 moves along the rotation direction of the rotating seal ring 20 while taking a shear force from the sliding surface 21 and the atmosphere A of the inner space S1 is drawn into the first positive pressure generation groove 14. That is, the atmosphere A moves from the starting end 14A toward the terminating end 14B in the first positive pressure generation groove 14 as indicated by the arrow L3.

The atmosphere A moving toward the terminating end 14B increases the pressure of the acute angle portion 14$f$ of the wall portion 14$b$ of the first positive pressure generation groove 14 and the vicinity thereof and flows out between the sliding surfaces 11 and 21 as indicated by the arrow L4. That is, a positive pressure is generated in the acute angle portion 14$f$ and the vicinity thereof.

Since the atmosphere A in the first positive pressure generation groove 14 indicated by the arrow L4 acts to push back the sealing target fluid F in the vicinity of the terminating end 14B of the first positive pressure generation groove 14 toward the outer space S2, the sealing target fluid F does not leak to the inner space S1.

Next, a change in the force that separates the sliding surfaces 11 and 21 will be described with reference to FIG. 7.

First, since the bellows 7 urges the stationary seal ring 10 toward the rotating seal ring 20 during the non-operation of the general industrial machine in which the rotating seal ring 20 is not rotating, the sliding surfaces 11 and 21 are in the contact state and there is almost no leakage amount of the sealing target fluid F between the sliding surfaces 11 and 21 to the inner space S1.

Figures 7A, 7B, 7C:
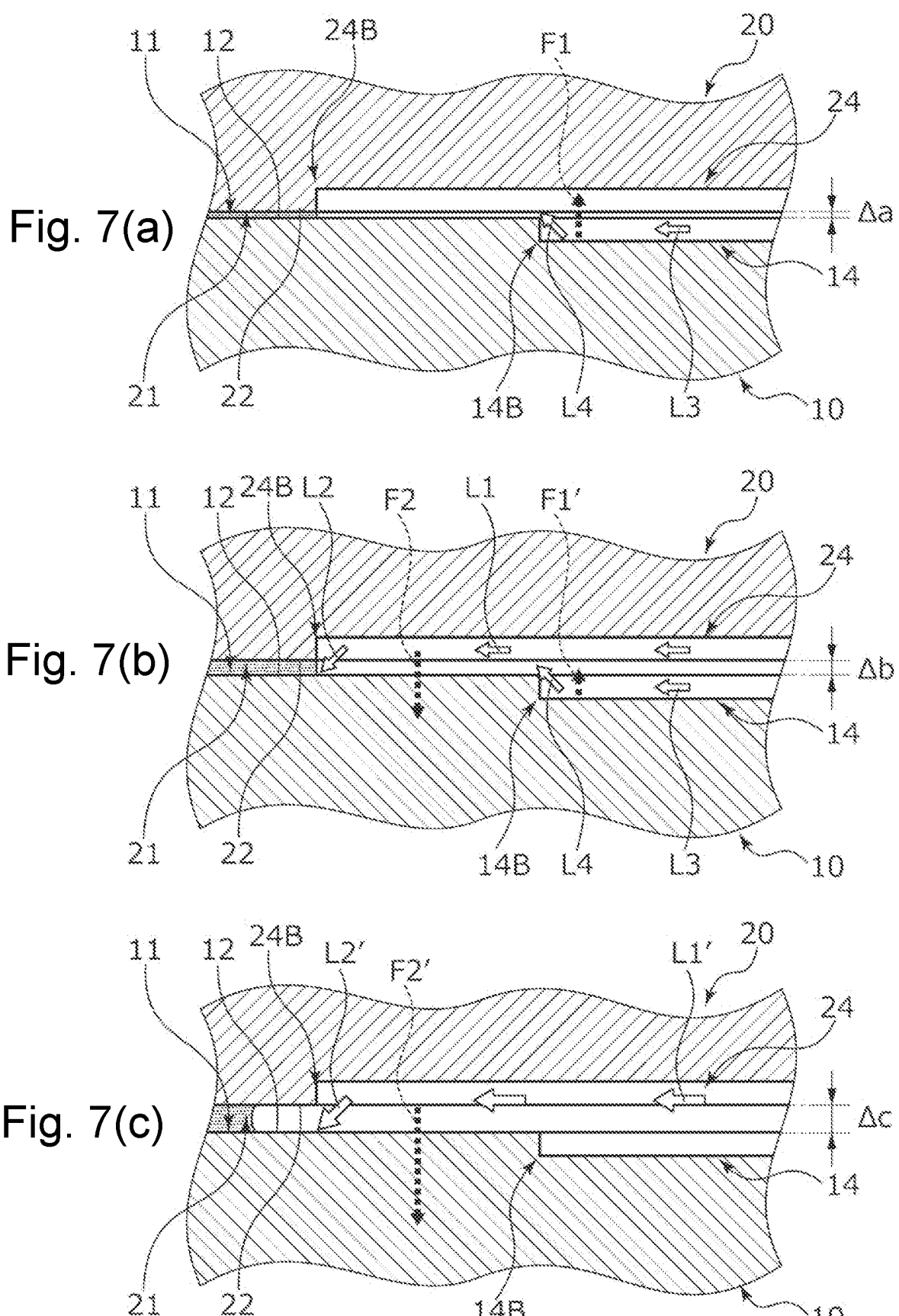
FIGS. 7A to 7C are cross-sectional views schematically showing a state for each relative rotation speed of a pair of sliding components in the first embodiment.

At a low speed immediately after the relative rotation of the rotating seal ring 20 relative to the stationary seal ring 10, as shown in FIG. 7A, a positive pressure is generated at the terminating end 14B of the first positive pressure generation groove 14 with a capacity smaller than the capacity of the second positive pressure generation groove 24.

The sliding surfaces 11 and 21 are slightly separated by Aa using a first force F1 caused by the positive pressure generated at the terminating end 14B of the first positive pressure generation groove 14. Accordingly, the sealing target fluid F flows from the outer space S2 between the sliding surfaces 11 and 21 on the outer radial side. In this way, since the sealing target fluid F is interposed between the sliding surfaces 11 and 21, lubricity is improved even at the low speed rotation and wear between sliding surfaces 11 and 21 can be suppressed. Additionally, since the levitation distance between the sliding surfaces 11 and 21 is small, the sealing target fluid F does not leak to the inner space S1.

On the other hand, since the capacity of the second positive pressure generation groove 24 is larger than the capacity of the first positive pressure generation groove 14, the atmosphere A is not sufficiently sealed in the second positive pressure generation groove 24 during the low-speed relative rotation of the rotating seal ring 20 and the stationary seal ring 10 and hence a high positive pressure is not generated. Then, a second force F2 (not shown in FIG. 7A) caused by the positive pressure generated in the second positive pressure generation groove 24 is smaller than the first force F1. Thus, the first force F1 mainly acts to separate the sliding surfaces 11 and 21 from each other during the low-speed rotation of the rotating seal ring 20.

When the relative rotation speed of the rotating seal ring 20 increases, the positive pressure increases at the terminating end 24B of the second positive pressure generation groove 24 as shown in FIG. 7B.

Since the second force F2 caused by the positive pressure generated at the terminating end 24B of the second positive pressure generation groove 24 is added, the sliding surfaces 11 and 21 are further separated by Δb (Δb>Δa) compared to FIG. 7A. Accordingly, the atmosphere A in the second positive pressure generation groove 24 mainly flows between the sliding surfaces 11 and 21 as indicated by the arrow L2.

Further, since the sliding surfaces 11 and 21 are further separated by Δb (Δb>Δa) compared to FIG. 7A, a first force F1' becomes small compared to FIG. 7A.

When the relative rotation speed of the rotating seal ring 20 further increases to the high-speed rotation, that is, a stable operation state is reached, as shown in FIG. 7C, the inflow amount (see the arrow L1' of FIG. 7C) of the atmosphere A drawn to the second positive pressure generation groove 24 further increases and a high positive pressure is generated. Then, a second force F2' increases and the sliding surfaces 11 and 21 are largely separated by Δc (Δc>Δb) compared to FIG. 7B.

Accordingly, the atmosphere A in the second positive pressure generation groove 24 further flows between sliding surfaces 11 and 21 as indicated by the arrow L2' compared to FIG. 7B.

The atmosphere A in the second positive pressure generation groove 24 indicated by the arrow L2' acts to push back the sealing target fluid F in the vicinity of the terminating end 24B of the second positive pressure generation groove 24 toward the outer space S2. In this way, the sealing target fluid F between the sliding surfaces 11 and 21 is pushed out to the outer space S2 during the high-speed rotation so that almost only the atmosphere A exists between the sliding surfaces 11 and 21.

In this embodiment, when the levitation distance increases due to the high-speed rotation of the rotating seal ring 20, the positive pressure generated in the first positive pressure generation groove 14 becomes negligibly small. Thus, the second force F2' mainly acts to separate the sliding surfaces 11 and 21 from each other during the high-speed rotation of the rotating seal ring 20.

Returning to FIG. 4, a plurality of intersection portions 15 of the first positive pressure generation groove 14 and the second positive pressure generation groove 24 are formed. Since the atmosphere A is also introduced from the second positive pressure generation groove 24 into the first positive pressure generation groove 14 through the intersection portion 15 in addition to the introduction of the atmosphere A from the starting end 14A, it is possible to generate the first force F1 (see FIG. 7) separating the sliding surfaces 11 and 21 from each other at an early time.

Next, a change in the intersection position between the first positive pressure generation groove 14 and the second positive pressure generation groove 24 during the relative rotation of the stationary seal ring 10 and the rotating seal ring 20 will be described with reference to FIG. 8. Additionally, here, for convenience of description, a change in the position of the intersection portion 15 between one first positive pressure generation groove 14 and one second positive pressure generation groove 24 will be described and the intersection portion 15 is illustrated by halftone dots.

Figures 8A, 8B, 8C:
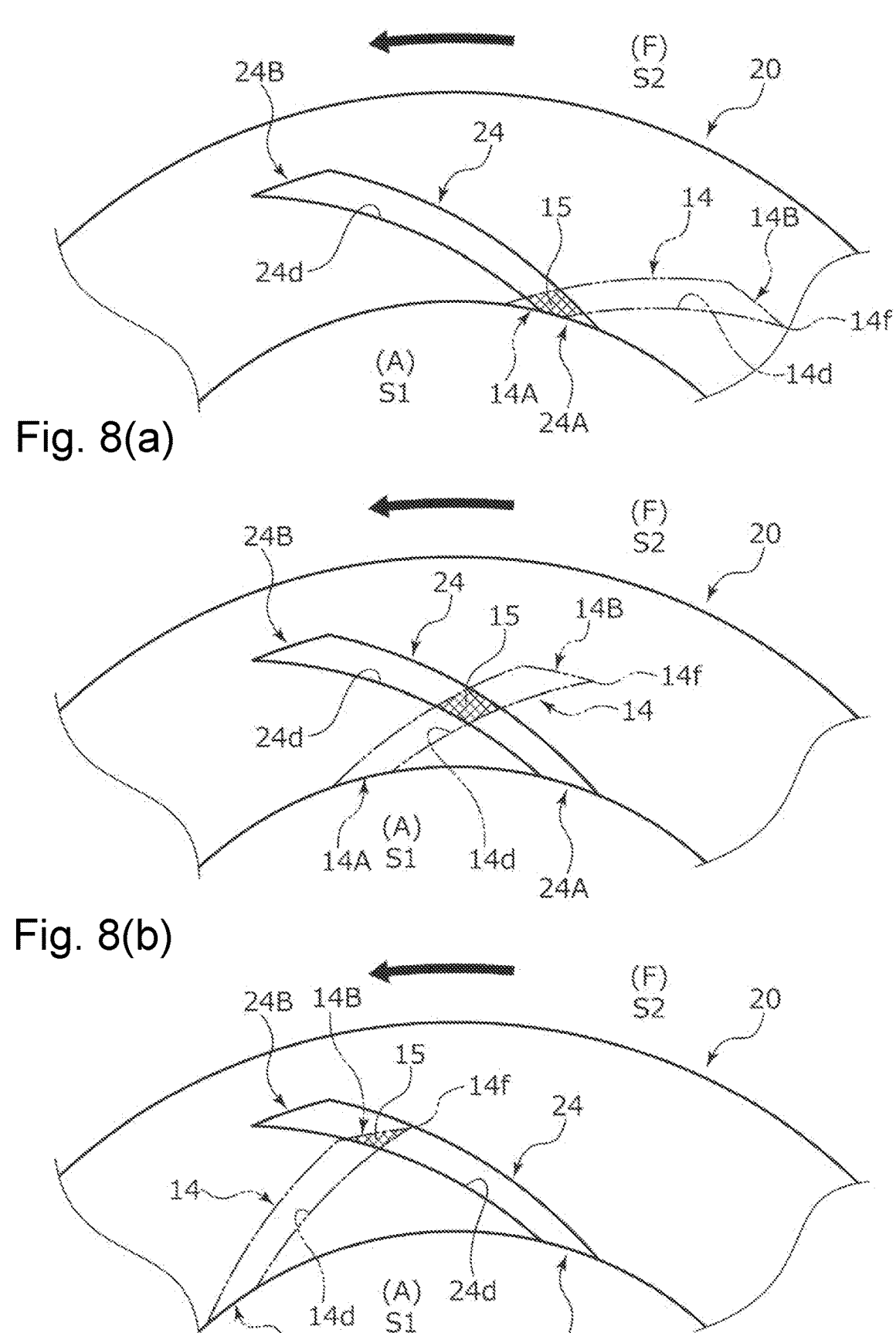
FIGS. 8A-8C are explanatory diagrams showing a change in position of an intersection portion between the first positive pressure generation groove and the second positive pressure generation groove in the first embodiment, where an intersection portion between one first positive pressure generation groove and one second positive pressure generation groove is taken up and illustrated.

FIG. 8A shows a state in which the starting end 14A of the first positive pressure generation groove 14 and the starting end 24A of the second positive pressure generation groove 24 intersect each other when viewed from the axial direction. That is, the intersection portion 15 with the second positive pressure generation groove 24 is located at the starting end 14A of the first positive pressure generation groove 14.

When the rotating seal ring 20 rotates relative to the stationary seal ring 10, as shown in FIG. 8B, the intersection portion 15 moves toward the terminating end 14B of the first positive pressure generation groove 14 to be located at the longitudinal center portion of the first positive pressure generation groove 14.

At this time, the fluid in the second positive pressure generation groove 24 is accumulated in the intersection portion 15 due to the side wall portion 14*d* of the first positive pressure generation groove 14 and the pressure of the intersection portion 15 is higher than that of the portion other than the intersection portion 15 in the first positive pressure generation groove 14 and the second positive pressure generation groove 24.

Furthermore, when the rotating seal ring 20 rotates relative to the stationary seal ring 10, as shown in FIG. 8C, the intersection portion 15 moves to be located at the terminating end 14B of the first positive pressure generation groove 14.

At this time, the fluid mass collected in the intersection portion 15 receives a shear force at the side wall portion 24*d* of the second positive pressure generation groove 24 and the acute angle portion 14*f* of the first positive pressure generation groove 14 to generate a large positive pressure.

In this way, since the fluid mass in the intersection portion 15 is moved from the starting end 14A to the terminating end 14B of the first positive pressure generation groove 14 to generate a large positive pressure at the terminating end 14B of the first positive pressure generation groove 14, it is possible to generate the first force F1 (see FIG. 7) for separating the sliding surfaces 11 and 21 from each other at an early time.

As described above, since the sliding surface 11 of the stationary seal ring 10 and the sliding surface 21 of the rotating seal ring 20 slide on each other while the first positive pressure generation groove 14 and the second positive pressure generation groove 24 intersect each other and the intersection portions 15 of the first positive pressure generation groove 14 and the second positive pressure generation groove 24 communicate with each other, it is also possible to take a fluid from the facing second positive pressure generation groove 24 in addition to the starting end 14A of the first positive pressure generation groove 14 during the low-speed relative rotation and to immediately generate the first force F1.

Further, since the volume of the first positive pressure generation groove 14 is smaller than the volume of the second positive pressure generation groove 24, the first force F1 caused by the positive pressure generated by the atmosphere A in the first positive pressure generation groove 14 mainly acts to separate the sliding surfaces 11 and 21 from each other during the low-speed relative rotation of the stationary seal ring 10 and the rotating seal ring 20. As the relative rotation speed of the stationary seal ring 10 and the rotating seal ring 20 increases, the second force F2 caused by the positive pressure generated by the atmosphere A in the second positive pressure generation groove 24 increases. When the relative rotation speed of the stationary seal ring 10 and the rotating seal ring 20 is sufficiently high, the second force F2 becomes larger than the first force F1. Accordingly, the second force F2 mainly acts to separate the sliding surfaces 11 and 21 from each other. Accordingly, it is possible to suppress the wear between the sliding surfaces 11 and 21 from the low speed to the high speed of the relative rotation of the stationary seal ring 10 and the rotating seal ring 20.

Further, since a gap formed between the sliding surfaces 11 and 21 increases during the high-speed relative rotation of the stationary seal ring 10 and the rotating seal ring 20, a positive pressure is not easily generated in the first positive pressure generation groove 14. Accordingly, the second force F2 caused by the positive pressure generated in the second positive pressure generation groove 24 mainly acts to stably separate the sliding surfaces 11 and 21 from each other. Thus, it is possible to suppress the wear between the sliding surfaces 11 and 21 from the low speed to the high speed of the relative rotation of the stationary seal ring 10 and the rotating seal ring 20.

Further, the plurality of second positive pressure generation grooves 24 intersect one first positive pressure generation groove 14. Then, since it is possible to take the atmosphere A from the second positive pressure generation groove 24 into the plurality of first positive pressure generation grooves 14 during the relative rotation of the stationary seal ring 10 and the rotating seal ring 20, it is possible to generate the first force F1 at an early time.

Further, it is possible to continuously generate a positive pressure in the first positive pressure generation groove 14 during the relative rotation of the stationary seal ring 10 and the rotating seal ring 20 and to stably generate the first force F1.

Further, the first positive pressure generation groove 14 and the second positive pressure generation groove 24 extend from the inner space S1 toward the outer radial side to be inclined in the circumferential direction. Accordingly, since a large number of the first positive pressure generation grooves 14 and the second positive pressure generation grooves 24 can be arranged on the sliding surfaces 11 and 21 of the stationary seal ring 10 and the rotating seal ring 20, the degree of freedom in design is high.

Further, since the terminating end 14B of the first positive pressure generation groove 14 and the terminating end 24B of the second positive pressure generation groove 24 are offset in the radial direction and the positive pressure generated at the terminating end 14B of the first positive pressure generation groove 14 does not interfere with the positive pressure generated at the terminating end 24B of the second positive pressure generation groove 24, it is possible to stably separate the sliding surfaces 11 and 21 from each other.

Further, the extension length L10 of the first positive pressure generation groove 14 is shorter than the extension length L20 of the second positive pressure generation groove 24. Accordingly, since the terminating end 14B of the first positive pressure generation groove 14 is close to the starting end 14A communicating with the inner space S1 in relation to the terminating end 24B of the second positive pressure generation groove 24, it is possible to generate a positive pressure in the first positive pressure generation groove 14 at an early time.

Further, since it is possible to adjust the magnitudes of the first force F1 and the second force F2 by adjusting the lengths of the first positive pressure generation groove 14 and the second positive pressure generation groove 24, the depth and width of the first positive pressure generation groove 14 and the second positive pressure generation groove 24 can be made the same dimensions, and the design is simple.

Further, since the stationary seal ring 10 is provided with the first positive pressure generation groove 14, the positive pressure generated in the first positive pressure generation groove 14 becomes stable during the low-speed relative rotation of the rotating seal ring 20. Further, since the rotating seal ring 20 is provided with the second positive pressure generation groove 24, it is possible to easily introduce the fluid into the second positive pressure generation groove 24 and to separate the sliding surfaces 11 and 21 from each other at an early time by mainly using the second force F2.

Figure 9:
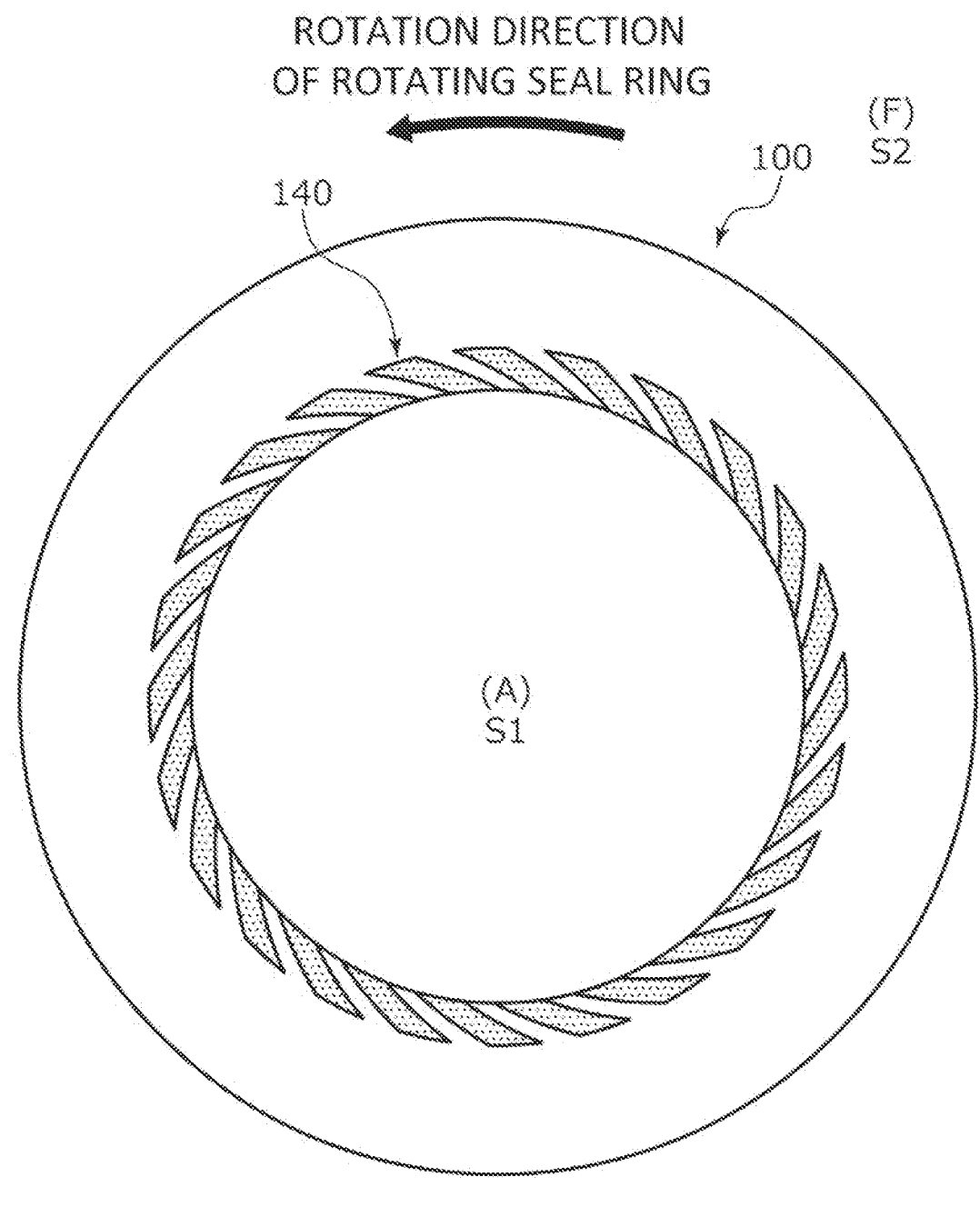
FIG. 9 is an explanatory diagram showing a first modified example of the first positive pressure generation groove in the first embodiment.

In addition, in this first embodiment, an embodiment in which the extension length L10 of the first positive pressure generation groove 14 is about ⅔ of the extension length L20 of the second positive pressure generation groove 24 has been illustrated, but as shown in FIG. 9, the length of the second positive pressure generation groove 140 of the stationary seal ring 100 may be about ⅓ of the length of the second positive pressure generation groove 24 (see FIG. 2). That is, the lengths of the first positive pressure generation groove and the second positive pressure generation groove may be freely changed.

Second Embodiment

Next, a pair of sliding components according to a second embodiment of the present invention will be described with reference to FIG. 10. Additionally, the description of the configuration overlapping with the same configuration as that of the first embodiment will be omitted. Additionally, FIG. 10 is a schematic cross-sectional view in which cross-sections obtained by cutting one set of first positive pressure generation grooves and one set of second positive pressure generation grooves in the longitudinal direction are arranged at the same positions in the axial direction for convenience of description.

Figure 10:
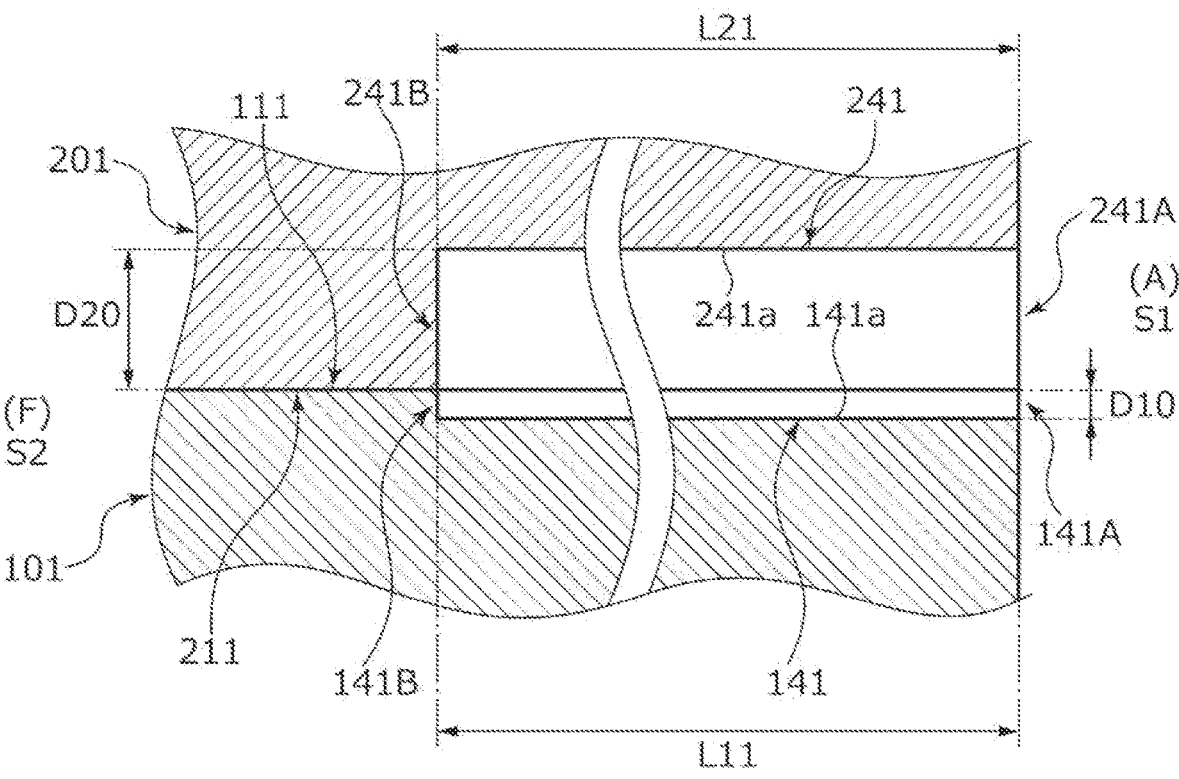
FIG. 10 is an explanatory diagram schematically showing an example of a mechanical seal including a pair of sliding components according to a second embodiment of the present invention.

As shown in FIG. 10, a second positive pressure generation groove 241 of a rotating seal ring 201 has a constant depth D20 from a starting end 241A to a terminating end 241B.

Further, a first positive pressure generation groove 141 of a stationary seal ring 101 has a constant depth D10 from a starting end 141A to a terminating end 141B.

The depth D20 of the second positive pressure generation groove 241 is deeper than the depth D10 of the first positive pressure generation groove 141 (D10<D20).

Further, the extension length L11 of the first positive pressure generation groove 141 and the extension length L21 of the second positive pressure generation groove 241 are the same dimensions (L11=L21). Additionally, although not shown in the drawings, the width dimension of the first positive pressure generation groove 141 is the same as the width dimension of the second positive pressure generation groove 241.

That is, since the volume of the first positive pressure generation groove 141 is smaller than the volume of the second positive pressure generation groove 241, a first force (not shown) caused by the positive pressure generated in the first positive pressure generation groove 141 mainly acts to separate the sliding surfaces 111 and 211 from each other during the low-speed relative rotation of the stationary seal ring 101 and the rotating seal ring 201.

Further, since the atmosphere A on the side of a bottom surface 141a of the first positive pressure generation groove 141 easily receives a shear force compared to the atmosphere A on the side of a bottom surface 241a of the second positive pressure generation groove 241, it is possible to generate a positive pressure in the first positive pressure generation groove 141 at an early time.

In addition, in this second embodiment, an embodiment in which the extension length L11 of the first positive pressure generation groove 141 is the same as the extension length L21 of the second positive pressure generation groove 241 has been illustrated, but the present invention is not limited thereto. For example, the volume of the first positive pressure generation groove may be smaller than the volume of the second positive pressure generation groove and the stationary seal ring may include the first positive pressure generation groove having a length dimension different from the second positive pressure generation groove. Further, the rotating seal ring may include the second positive pressure generation groove having a length dimension different from the first positive pressure generation groove.

Third Embodiment

Next, a pair of sliding components according to a third embodiment of the present invention will be described with reference to FIG. 11. Additionally, the description of the configuration overlapping with the same configuration as that of the first embodiment will be omitted.

Figure 11A:
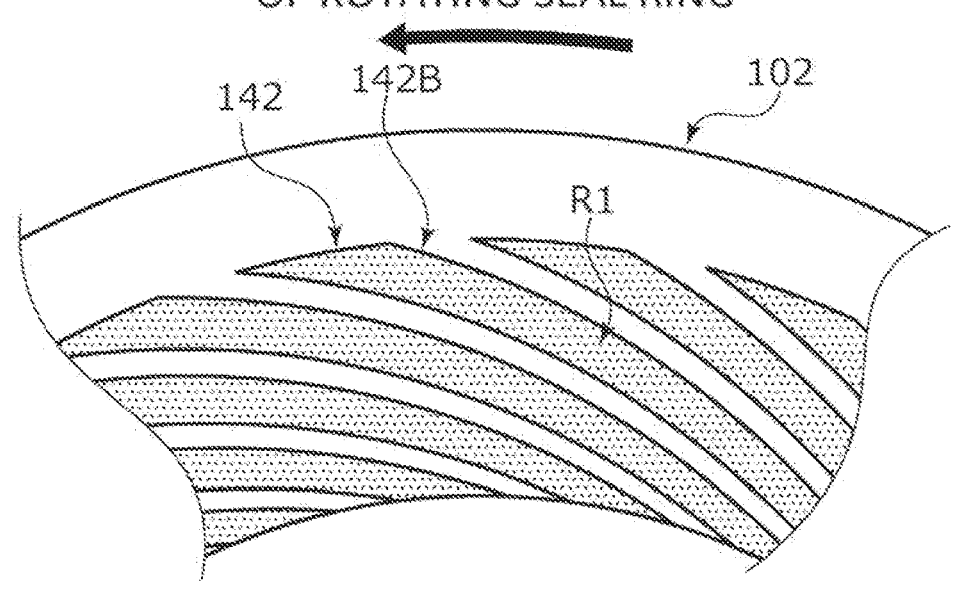
FIGS. 11A-11B are explanatory diagrams schematically showing an example of a mechanical seal including a pair of sliding components according to a third embodiment of the present invention.
Figure 11B:
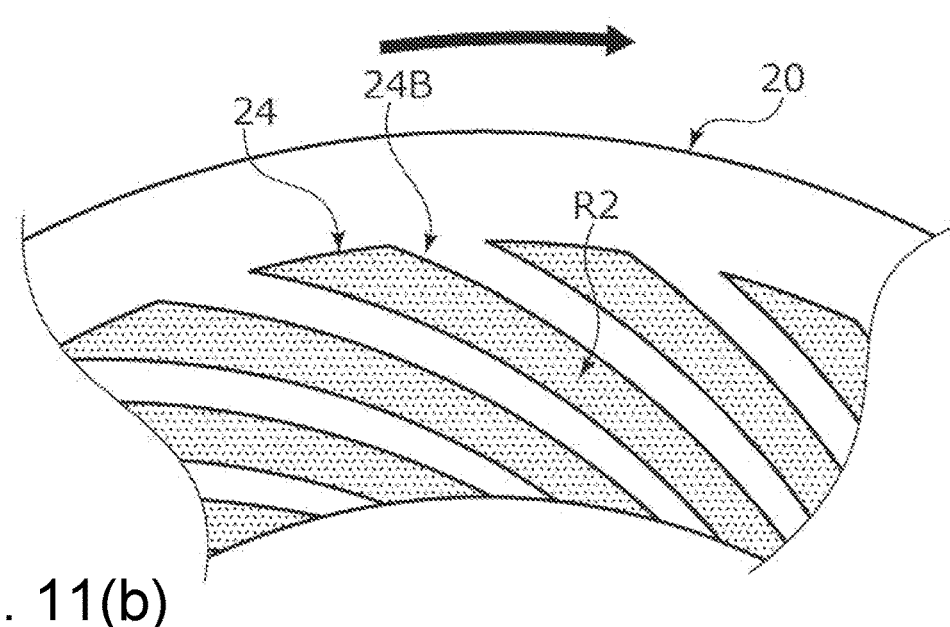

As shown in FIG. 11, a first positive pressure generation groove 142 of a stationary seal ring 102 is inclined along the circumferential direction compared to the second positive pressure generation groove 24 of the rotating seal ring 20.

Further, a terminating end 142B of the first positive pressure generation groove 142 and the terminating end 24B of the second positive pressure generation groove 24 are provided at the same position in the radial direction and overlap each other when viewed from the axial direction.

Further, the area R1 of this first positive pressure generation groove 142 from the axial direction is smaller than the area R2 of the second positive pressure generation groove 24 (R1<R2). Further, although not shown in the drawings, the depth of the first positive pressure generation groove 142 of this embodiment is the same as the depth of the second positive pressure generation groove 24.

That is, the volume of the first positive pressure generation groove 142 is smaller than the volume of the second positive pressure generation groove 24. Additionally, the area R1 of the first positive pressure generation groove 142 is the same as the area R2 of the second positive pressure generation groove 24 and the depths are different from each other.

As described above, since the first positive pressure generation groove 142 of the stationary seal ring 102 is inclined along the circumferential direction compared to the second positive pressure generation groove 24 of the rotating seal ring 20, it is possible to easily introduce the atmosphere A into the first positive pressure generation groove 142 compared to the second positive pressure generation groove 24 when the relative rotation of the stationary seal ring 102 and the rotating seal ring 20 starts and thus to easily generate a positive pressure in the first positive pressure generation groove 142 at an early time.

Fourth Embodiment

Next, a pair of sliding components according to a fourth embodiment will be described with reference to FIG. 12. Additionally, the description of the configuration overlapping with the same configuration as that of the first embodiment will be omitted. Additionally, FIG. 12 shows a sliding surface of this stationary seal ring from the axial direction, the first positive pressure generation groove is indicated by a solid line, and the facing second positive pressure generation groove is indicated by a two-dotted chain line.

Figure 12:
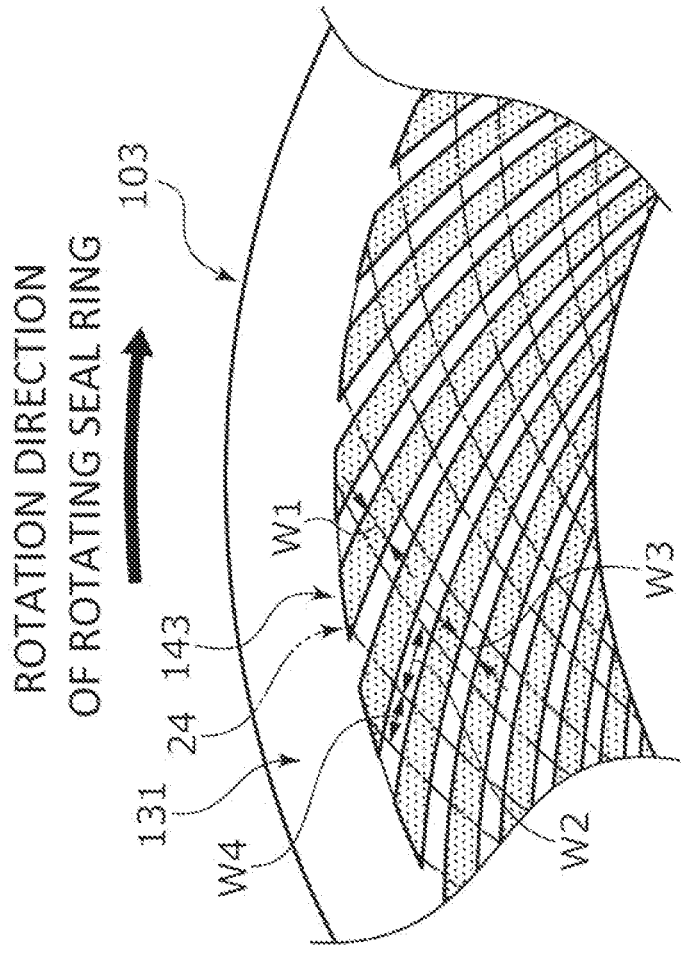
FIG. 12 is an explanatory diagram schematically showing an example of a mechanical seal including a pair of sliding components according to a fourth embodiment of the present invention.

As described above, in the rotating seal ring 20 (see FIG. 2), twenty four second positive pressure generation grooves 24 are evenly arranged in the circumferential direction of the sliding surface 11 (see FIG. 2) and as shown in FIG. 12, one second positive pressure generation groove 24 has a circumferential width W2.

In a stationary seal ring 103, forty eight first positive pressure generation grooves 143 are evenly arranged in the circumferential direction of a sliding surface 131 (only a part thereof is shown here). That is, the number of the first positive pressure generation grooves 143 is double the number of the second positive pressure generation grooves 24.

The circumferential width W1 of the first positive pressure generation groove 143 is smaller than the circumferential width W2 of the second positive pressure generation groove 24 (W1<W2) and the separation width W3 between the adjacent first positive pressure generation grooves 143 is smaller than the separation width W4 between the second positive pressure generation grooves 24. Accordingly, the number of the first positive pressure generation grooves 143 can be double the number of the second positive pressure generation grooves 24.

Further, the first positive pressure generation groove 143 and the second positive pressure generation groove 24 have the same extension length. That is, the area of this first positive pressure generation groove 143 from the axial direction becomes smaller than the area of the second positive pressure generation groove 24.

Further, although not shown in the drawings, the depth of the first positive pressure generation groove 143 of this embodiment is the same as the depth of the second positive pressure generation groove 24. That is, the volume of the first positive pressure generation groove 143 is smaller than the volume of the second positive pressure generation groove 24.

Accordingly, since the number of the first positive pressure generation grooves 143 is double the number of the second positive pressure generation grooves 24, it is possible to evenly generate the first force F1 (not shown here) over the circumferential direction of the sliding surface 131 of the stationary seal ring 103. Further, since the volume of the first positive pressure generation groove 143 can be smaller than the volume of the second positive pressure generation groove 24, it is possible to generate a positive pressure in the first positive pressure generation groove 143 at an early time.

Figure 13:
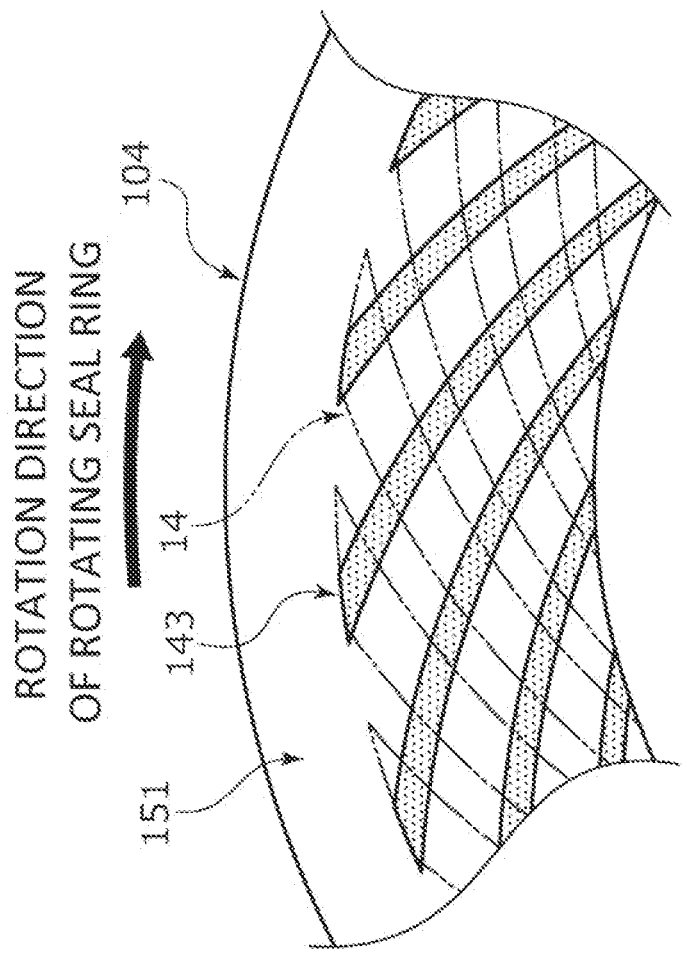
FIG. 13 is an explanatory diagram showing a second modified example of a first positive pressure generation groove in the fourth embodiment.

In addition, in this fourth embodiment, an embodiment in which the number of the first positive pressure generation grooves 143 formed on the sliding surface 131 of the stationary seal ring 103 is double the number of the second positive pressure generation grooves 24 has been illustrated. However, for example, as shown in FIG. 13, the first positive pressure generation groove 143 may be provided on a sliding surface 151 of the stationary seal ring 104 with the same number of the second positive pressure generation grooves 24. For example, twenty four first positive pressure generation grooves may be provided. Additionally, if the volume of the second positive pressure generation groove is smaller than the volume of the first positive pressure generation groove, the number of the second positive pressure generation grooves may be smaller than the number of the first positive pressure generation grooves.

Although the embodiments of the present invention have been described with reference to the drawings, the specific configuration is not limited to these embodiments and is included in the present invention even if there are changes or additions within the scope of the present invention.

For example, in the above-described embodiments, as the sliding component, the mechanical seal for general industrial machines has been described as an example, but other mechanical seals for automobiles, water pumps, and the like may be used. Further, the present invention is not limited to the mechanical seal and may be a sliding component other than the mechanical seal such as a slide bearing.

Further, in the above-described embodiments, an embodiment in which the stationary seal ring is provided with the first positive pressure generation groove and the rotating seal ring is provided with the second positive pressure generation groove has been illustrated, but the present invention is not limited thereto. For example, the stationary seal ring may be provided with the second positive pressure generation groove and the rotating seal ring may be provided with the first positive pressure generation groove.

Further, in the above-described embodiments, an embodiment in which the first positive pressure generation groove and the second positive pressure generation groove extend from the leakage side toward the sealing target fluid side to be inclined in the circumferential direction has been illustrated, but the present invention is not limited thereto. For example, the first positive pressure generation groove or the second positive pressure generation groove may be composed of only the component extending in the circumferential direction. That is, one of the first positive pressure generation groove and the second positive pressure generation groove may have a component extending in the radial direction and a component extending in the circumferential direction and the first positive pressure generation groove and the second positive pressure generation groove may face each other to intersect each other in at least a part thereof.

Further, in the above-described embodiments, an embodiment in which the cross-sectional shape of the first positive pressure generation groove and the second positive pressure generation groove is constant in the longitudinal direction has been illustrated, but when the capacity of the first positive pressure generation groove is smaller than the capacity of the second positive pressure generation groove, for example, a step or an inclined surface may be formed on the bottom surfaces of the first positive pressure generation groove and the second positive pressure generation groove.

Further, the sealing target fluid side has been described as the high pressure side and the leakage side has been described as the low pressure side. However, the sealing target fluid side may be the low pressure side, the leakage side may be the high pressure side, and the sealing target fluid side and the leakage side may have substantially the same pressure.

Further, in the above-described embodiments, an embodiment of the inside type that seals the sealing target fluid F tending to leak from the outer radial side of the sliding surface toward the inner radial side thereof has been described, but the present invention is not limited thereto. For example, an outside type that seals the sealing target fluid F tending to leak from the inner radial side of the sliding surface toward the outer radial side thereof may be used.

Further, in this embodiment, the sealing target fluid F has been described as the high-pressure liquid, but the present invention is not limited thereto. For example, the sealing target fluid may be a gas or a low-pressure liquid or may be a mist in which a liquid and a gas are mixed.

Further, in this embodiment, the leakage side fluid has been described as the atmosphere A corresponding to the low-pressure gas, but the present invention is not limited thereto. For example, the leakage side fluid may be a liquid or a high-pressure gas or may be a mist in which a liquid and a gas are mixed.

REFERENCE SIGNS LIST

10 Stationary seal ring (first sliding component)
11 Sliding surface
12 Land
14 First positive pressure generation groove
15 Intersection portion
20 Rotating seal ring (second sliding component)
21 Sliding surface
22 Land
24 Second positive pressure generation groove
A Atmosphere
D1, D2 Depth
F Sealing target fluid
F1 First force
F2 Second force
S1 Inner space (leakage side space)
S2 Outer space

The invention claimed is:

1. A rotating machine having a leakage side space and a sealed fluid space in which a sealed fluid is housed, and comprising:

a housing;

a rotary shaft;

a first sliding component fixed to one of the housing and the rotary shaft and having a sliding surface; and a second sliding component fixed to the remaining one of the housing and the rotary shaft and having a sliding surface sliding with the sliding surface of the first sliding component, wherein the sliding surface of the first sliding component is provided with a plurality of first positive pressure generation grooves each having an opening which is opened to a leakage side of the first sliding component, extending from the opening in a relative rotation direction of the second sliding component with respect to the first sliding component, and having closed terminating end portions configured to generate positive pressure, wherein the sliding surface of the first sliding component having an inner diameter equal to an inner diameter of the sliding surface of the second sliding component;

wherein the sliding surface of the first sliding component having an outer diameter equal to an outer diameter of the sliding surface of the second sliding component;

wherein the first positive pressure generation groves are separated from each other by part of a land which forms part of the sliding surface of the first sliding component, wherein the sliding surface of the second sliding component is provided with a plurality of second positive pressure generation grooves each having an opening which is opened to the leakage side of the second sliding component, extending from the opening of each of the second positive pressure generation grooves in a relative rotation direction of the first sliding component with respect to the second sliding component, and having closed terminating end portions configured to generate positive pressure, wherein the second positive pressure generation groves are separated from each other by part of a land which forms part of the sliding surface of the second sliding component, wherein the sliding surfaces of the first sliding component and the second sliding component slide on each other at least in such a manner that the first positive pressure generation grooves and the second positive pressure generation grooves overlap and intersect with each other, wherein at least part of the second positive pressure generation grooves communicating with the leakage side have radial lengths larger than radial lengths of the first positive pressure generation grooves communicating with the leakage side, wherein the closed terminal ends of all of the second positive pressure generation grooves are disposed on the sealed fluid side in a radial direction with respect to the closed terminal ends of all of the first positive pressure generation grooves, wherein at least two of the second positive pressure generation grooves are arranged to intersect with each of the first positive pressure generation grooves, wherein all of the first positive pressure generation grooves and all of the second positive pressure generation grooves obliquely extend in a circumferential direction from the leakage side toward a sealed fluid side, wherein the volume of each of the first positive pressure generation grooves is smaller than the volume of each of the second positive pressure generation grooves, wherein all of the grooves of the first pressure generating grooves are of the same radial length relative to one another, wherein all of the grooves of the second pressure generation grooves are of the same length relative to one another, and wherein the radial lengths of all of the second positive pressure generation grooves communicating with the leakage side is larger than the radial lengths of all of the first positive pressure generation grooves communicating with the leakage side.

\* \* \* \* \*